US009630233B2

(12) United States Patent
Schlatter

(10) Patent No.: US 9,630,233 B2
(45) Date of Patent: Apr. 25, 2017

(54) METHOD AND APPARATUS TO MANUFACTURE METALLIC BIPOLAR PLATES

(71) Applicant: Feintool Intellectual Property AG, Lyss (CH)

(72) Inventor: Ulrich Schlatter, Lyss (CH)

(73) Assignee: FEINTOOL INTERNATIONAL HOLDING AG, Lyss (CH)

( * ) Notice: Subject to any disclaimer, the term of this patent is extended or adjusted under 35 U.S.C. 154(b) by 905 days.

(21) Appl. No.: 13/672,355

(22) Filed: Nov. 8, 2012

(65) Prior Publication Data

US 2013/0186163 A1 Jul. 25, 2013

(30) Foreign Application Priority Data

Dec. 22, 2011 (EP) .................................... 11010139

(51) Int. Cl.
*B21D 35/00* (2006.01)
*H01M 8/0206* (2016.01)
(Continued)

(52) U.S. Cl.
CPC ........... *B21D 35/001* (2013.01); *B21D 28/10* (2013.01); *B21D 28/16* (2013.01); *H01M 8/0206* (2013.01);
(Continued)

(58) Field of Classification Search
CPC ...... B21D 28/02; B21D 28/14; B21D 28/145; B21D 28/10; B21D 35/002; B21D 35/00;
(Continued)

(56) References Cited

U.S. PATENT DOCUMENTS 3,570,343 A * 3/1971 Wolnosky .............. B21D 28/16
83/124
3,635,067 A * 1/1972 Hanas .................... B21D 28/16
72/329
(Continued)

FOREIGN PATENT DOCUMENTS

CH       EP 2140954 A1 *  1/2010 ............. B21D 28/10
DE    10 2004 016 318       10/2005
(Continued)

OTHER PUBLICATIONS

Blanking and Fineblanking, Simulation Techniques in Manufacturing Technology, Lecture 5, Fraunhofer, pp. 1-41.

*Primary Examiner* — Jimmy T Nguyen
*Assistant Examiner* — Gregory Swiatocha
(74) *Attorney, Agent, or Firm* — Norris McLaughlin & Marcus, P.A.

(57) ABSTRACT

A bipolar plate having a surface structure for a flow field, inner forms such as holes and slots in the plate, and a reference geometry on the outer form thereof is produced by means of a hydraulic fine-blanking press having an at least three-stage progressive die, in the first stage of which a blank is cut partially free from a metal-foil strip, subsequently in a second stage the surface structure is formed in the connected blank via compression-forming using a forming force of at least 2500 to 3500 kN, the inner form, the slots and the reference geometry are formed by way of cutting in, and on, the blank and then, in a third stage, cutting of the outer contour and removal of the finished blank in the form of the bipolar plate are carried out successively in the stroke cycle.

16 Claims, 7 Drawing Sheets

(51) Int. Cl.
*B21D 28/10* (2006.01)
*B21D 28/14* (2006.01)
*B21D 28/16* (2006.01)
*B21D 28/06* (2006.01)
*B21D 37/08* (2006.01)

(52) U.S. Cl.
CPC .............. *B21D 28/06* (2013.01); *B21D 28/14* (2013.01); *B21D 28/145* (2013.01); *B21D 37/08* (2013.01); *Y02P 70/56* (2015.11)

(58) Field of Classification Search
CPC ...... B21D 35/001; B21D 37/08; B21D 37/10; B21D 28/00; B21D 28/16
See application file for complete search history.

(56) References Cited

U.S. PATENT DOCUMENTS

| | | | |
|---|---|---|---|
| 4,477,537 A * | 10/1984 | Blase | B21D 28/16 428/577 |
| 4,905,556 A * | 3/1990 | Haack et al. | 83/639.5 |
| 5,247,825 A * | 9/1993 | Erickson | 72/339 |
| 5,526,668 A * | 6/1996 | Futamura et al. | 72/324 |
| 6,240,818 B1 * | 6/2001 | Baltschun | 83/137 |
| 6,682,625 B1 * | 1/2004 | Futamura | B21D 28/02 156/252 |
| 6,852,189 B2 * | 2/2005 | Futamura | B21D 35/00 156/252 |
| 7,249,546 B1 * | 7/2007 | Fosnaugh | 83/50 |
| 7,806,031 B1 * | 10/2010 | Rytz et al. | 83/390 |
| 8,088,535 B2 | 1/2012 | Sommer et al. | |
| 2001/0043134 A1 * | 11/2001 | Decristofaro et al. | 335/302 |
| 2004/0151975 A1 * | 8/2004 | Allen | 429/38 |
| 2005/0072200 A1 * | 4/2005 | Hering | 72/133 |
| 2005/0241360 A1 * | 11/2005 | Miller et al. | 72/420 |
| 2006/0021414 A1 * | 2/2006 | Cowie | 72/335 |
| 2006/0277745 A1 * | 12/2006 | Muncy et al. | 29/558 |
| 2007/0170023 A1 * | 7/2007 | Yamamoto | F16D 65/092 188/250 G |
| 2009/0090157 A1 * | 4/2009 | Schlatter | 72/336 |
| 2009/0182338 A1 * | 7/2009 | Walen et al. | 606/82 |
| 2010/0187121 A1 * | 7/2010 | Metzger et al. | 205/247 |
| 2011/0081591 A1 * | 4/2011 | Scherer et al. | 429/457 |
| 2011/0132162 A1 * | 6/2011 | Grimm | B21D 28/10 83/27 |
| 2015/0355420 A1 * | 12/2015 | Li | G02B 6/3648 385/35 |

FOREIGN PATENT DOCUMENTS

| | | |
|---|---|---|
| DE | 10 2005 021 487 | 11/2006 |
| DE | 10 2009 036 039 | 2/2011 |
| DE | 10 2009 059 769 | 6/2011 |
| DE | 10 2010 020 178 | 11/2011 |
| DE | 10 2010 022 094 | 12/2011 |

\* cited by examiner

METHOD AND APPARATUS TO MANUFACTURE METALLIC BIPOLAR PLATES

BACKGROUND OF THE INVENTION

The invention relates to a method for producing a bipolar plate comprising a metal-foil strip having a a flow field, inner forms such as holes and slots in the plate, and at least one reference geometry on the outer form thereof, in which the strip is fed to a tool, which opens at the lower dead-center position of the ram of a press, and closes at the upper dead-center position of the ram of the press, is clamped between an upper tool part, which comprises at least a forming punch, a cutting- and piercing punch and a guide and is mounted on the press table, and at least one lower tool part, which performs a stroke between the upper and lower dead-center positions upon closing, and includes a cutting die, the strip finally being subjected to a surface structure for cutting and forming operation.

The invention further relates to an apparatus (in the specification hereafter referred to as a "device"), for producing a bipolar plate comprising a metal-foil strip having a surface structure for a flow field, inner forms such as holes and slots in the plate, and a reference geometry on the outer form thereof, the device comprising a progressive die driven by a ram of a press, the upper tool part thereof, which is mounted on the press table, including at least one piercing and cutting punch and a guide holder, and the lower tool part thereof, which performs a stroke between the upper and lower dead-center positions of the piston, including at least one cutting die.

As is known, bipolar plates for fuel cells comprise an anode side and a cathode side, which are optionally separated from one another by an intermediate wall (interconnection plate). The anode and cathode sides are formed as structured flat plates, the function of which in a fuel cell is to provide an electric connection for the fuel cell and to supply this with hydrogen and air/oxygen as the oxidizing agent. In order to ensure that the fuel cell supply is uniform across the cross-sectional area, the bipolar plate has a flow field formed of a plurality of adjacently disposed channels or grooves, through which the process gases flow along the grooves to the reaction zones, and through which the resultant product water drains off. The bipolar plate comprises holes, which are separated from one another, via which the hydrogen that serves as the fuel, air/oxygen that serves as the oxidizing agent and water that serves as the coolant are simultaneously fed into the respective flow channels. Complex technical requirements are placed on the bipolar plate, namely: that it conduct the gases and current with minimal electrical resistance; have high resistance to aggressive chemical conditions; dissipate the resultant reaction heat; be corrosion-resistant to fuel, oxygen and water; separate the gases from one another; and have high temperature resistance, strong mechanical strength, and dimensional stability, at a low weight and with a small volume.

It is known to use metal foils for such bipolar plates, which are brought into the desired shape via stamping, deep drawing, punching or forming operations based on active means, such as hydroforming (DE 10 2005 021 487 A1, DE 10 2009 059 769, DE 10 2004 016 318 A1, DE 10 2009 036 039 A1). All these known solutions have the disadvantage that the required geometrical trueness cannot be ensured. As a result, an offset arises in the channel geometries and the holes in the bipolar plates, which can lead to safety-relevant malfunctions of the fuel cell. Thermal processes (see DE 10 2010022094A1) regularly necessitate cost-intensive remachining due to the resultant burr.

Furthermore, DE 10 2010 020 178 A1 makes known a method for producing a metallic bipolar plate for a fuel cell stack, which has a gas distribution structure on each of the two sides thereof. The gas distribution structures are created simultaneously on both sides by way of shearing.

This known method is limited to a thickness range of 0.5 to 5 mm, and thus the bipolar plates attain considerable weight and very large dimensions.

SUMMARY OF THE INVENTION

Proceeding from the state of the art, the object of the invention is to markedly increase the geometrical trueness and dimensional consistency of the bipolar plates via forming on a fine-blanking press while eliminating all finishing on the contours and ensuring economic advantages.

The gist of the solution according to the invention is to carry out the forming operation on the metal foil using the greatest possible forming force in the center of a fine-blanking press using an at least three-stage progressive die, in the first stage of which a blank is cut partially free in the strip; subsequently, in a second stage, the surface structure is formed in the blank via compression-forming using a forming force of at least 2500 to 3500 kN, the inner form, the slots and the reference geometry are formed by way of cutting in, and on, the blank; and then, in a third stage, cutting of the outer contour and removal of the finished blank for the bipolar plate are carried out successively in the stroke cycle.

It is advantageous that the surface structure is created by a forging die in the lower tool part and a suitable chasing form in the upper tool part, and the inner form (holes) and slots in the bipolar plate are created via a cutting and piercing punch in the upper part and female die openings disposed in the punch plate of the lower part, successively but within the same operation. This ensures that all important part geometries attain the best possible dimensional consistency with respect to one another and that locating pins are not needed in order to ensure the dimensional consistency of the contour from forming to cutting.

A further advantage is that, by way of compression-forming, different surface structures, and preferably a field of grooves, meander-shaped or spiral channels or a knob field can be formed in the blank, and grooves or channels having different cross-sectional shapes, such as u-, oval-, semicircular-, parabolic-, or v-shaped cross sections can be formed, thereby ensuring that the method according to the invention is highly flexible with respect to the market requirements of the plate manufacturer.

In a preferred embodiment of the method according to the invention, the following further measures are carried out:

a) free-cutting the end-face edges and, optionally, the lateral edges of the blank for a bipolar plate, wherein the blank remains connected to the strip, b) opening the tool upon the return stroke of the forming, piercing and cutting punch, and advancing the strip with the free-cut blank for compression-forming, piercing and cutting, wherein, after the strip has been clamped once more, the compression-forming of the surface structure is carried out first, followed by piercing within the blank and cutting the reference geometry on the outer form of the blank in a vertical sequence within the second working stage while retaining the connection of the blank to the strip, c) re-opening the tool upon retraction of the forming, cutting and piercing punch to the top dead-center position and advancing the free-cut, compression-formed, pierced and cut blank to the third working stage for cutting the outer contour of the bipolar plate, wherein the blank is separated from the previously clamped strip and, after a fall-through motion, is removed from the closed tool vertically below the cutting plane by way of a conveyor belt.

For electric contact to the bipolar plates, it has proven expedient for the end-face edge of the blank to be formed, during the return stroke of the forming, piercing and cutting punch within the second working stage, into a leg extending vertically in the direction of the upper part, by way of a bending punch provided in the upper part, wherein the geometrical trueness and dimensional consistency are not affected because the blank remains in the clamped state.

It is particularly advantageous that a further working stage, in the form of an optional no-load stroke, is carried out between the second and third working stages. This ensures that the states of stresses associated with the considerable forming forces do not affect the subsequent blank, because consecutive blanks in the strip have sufficient separation.

In a further embodiment of the method according to the invention, foils made of stainless steel, preferably of the quality 1.4404, X2CrNiMo18-14-3, steel, aluminum, aluminum alloys, titanium, titanium alloys and HASTELLOY™ alloys having a thickness of 0.1 to 0.5 mm are suitable as the metal-foil strip.

According to the invention, it is, of course, also possible to use metal compound alloys.

In terms of the assembly of the blanks produced according to the invention, it is particularly advantageous that a plurality of references, which ensure exact orientation and positioning of the individual blanks during joining and assembly, are cut into the outer form of the blank.

The device according to the invention is characterized in that the progressive die comprises at least one first stage for partially free-cutting the end-face edges and, optionally, the lateral edges of a blank for the bipolar plate, a second stage for forming the surface structure in the blank, piercing the inner forms and cutting the reference geometries on the free-cut but connected blank and a third stage for cutting the outer contour and removing the bipolar plate from the tool, wherein a fine-blanking press, having a knife-edged ring piston and a counterholder piston acting hydraulically in opposition on the upper tool part and the lower tool part, is provided as the press, the knife-edged ring piston and counterholder piston being coordinated with one another such that, in the second stage, at least one chasing form for forming precedes the piercing and cutting punches during the reciprocating motion thereof.

In a further advantageous embodiment of the device according to the invention, the lower tool part comprises at least one forging die inserted into a holder, the forging die having a structure adapted to the shape, configuration and position of the surface structure and holes in the bipolar plate; and the upper tool part has at least one chasing form, having a suitably formed surface structure, which is correspondingly adapted to the forging die and is inserted into a punch-guiding insert.

In a further embodiment of the device according to the invention, the first stage comprises, in the lower tool part, at least first and second cutting openings disposed in the cutting die for partially free-cutting the blank, and a free-cutting punch, wherein a waste channel is dedicated to the cutting opening that leads to a conveyor belt disposed underneath the lower tool part for removing waste from the tool.

According to a further advantageous embodiment of the device according to the invention, the second stage in the lower tool part comprises: at least one forging die inserted into a holder that has a surface structure adapted to the shape, configuration and position of the surface structure in the bipolar plate; at least one third and fourth cutting opening disposed in the cutting die for the inner-form punch and the cutting punch; and at least one chasing form having an suitably formed surface structure, which is correspondingly adapted to the forging die and is inserted into a punch-guiding insert, and comprises at least the inner-form and cutting punch in the upper tool part, wherein a waste channel is dedicated to each cutting opening, and leads to a conveyor belt disposed underneath the lower tool part for removing waste from the tool.

According to a further embodiment of the device according to the invention, the third stage in the upper tool part comprises at least one outer-contour cutting punch for cutting out the blank completely and at least one fifth cutting opening disposed in the cutting die, wherein a removal channel is dedicated to the cutting opening, which leads to a conveyor belt disposed underneath the lower tool part for removing the finished blank from the closed tool.

According to a preferred variant of the device according to the invention, a further stage in the form of a no-load stage can be inserted between the second and third stages.

It is particularly advantageous, in terms of electrical contact, that at least one bending punch for bending the end-face edges of the blank be integrated in the upper tool part in the second stage. This bending punch moves vertically during the return stroke of the stamping, piercing and cutting punch, in the direction of the lower part, and thereby forms the end-face edge of the blank into a projecting leg.

The forging die and the chasing form have a surface structure comprising grooves, meander-shaped spiral channels or knobs, which facilitates retrofitting the device according to the invention for different surface structures. The grooves or channels of the surface structures can therefore also be adjusted for various desired cross-sectional shapes, for example u-, oval-, semicircular-, parabolic- or v-shaped cross sections. The device according to the invention also makes it possible to use metal-foil strips made of stainless steel, preferably of the quality 1.4404, X2CrNiMo18-14-3, steel, aluminum, aluminum alloys, titanium, titanium alloys and HASTELLOY™ alloys having a thickness of 0.1 to 0.5 mm, and preferably 0.1 mm.

The solution according to the invention is characterized by allowing for the provision of anode- and cathode-side bipolar plates having high geometric trueness and dimensional consistency while eliminating all finishing on the contours and ensuring economic advantages.

Further advantages and details will become apparent from the description that follows, with reference to the attached drawings.

DETAILED DESCRIPTION OF THE INVENTION

Figure 1:
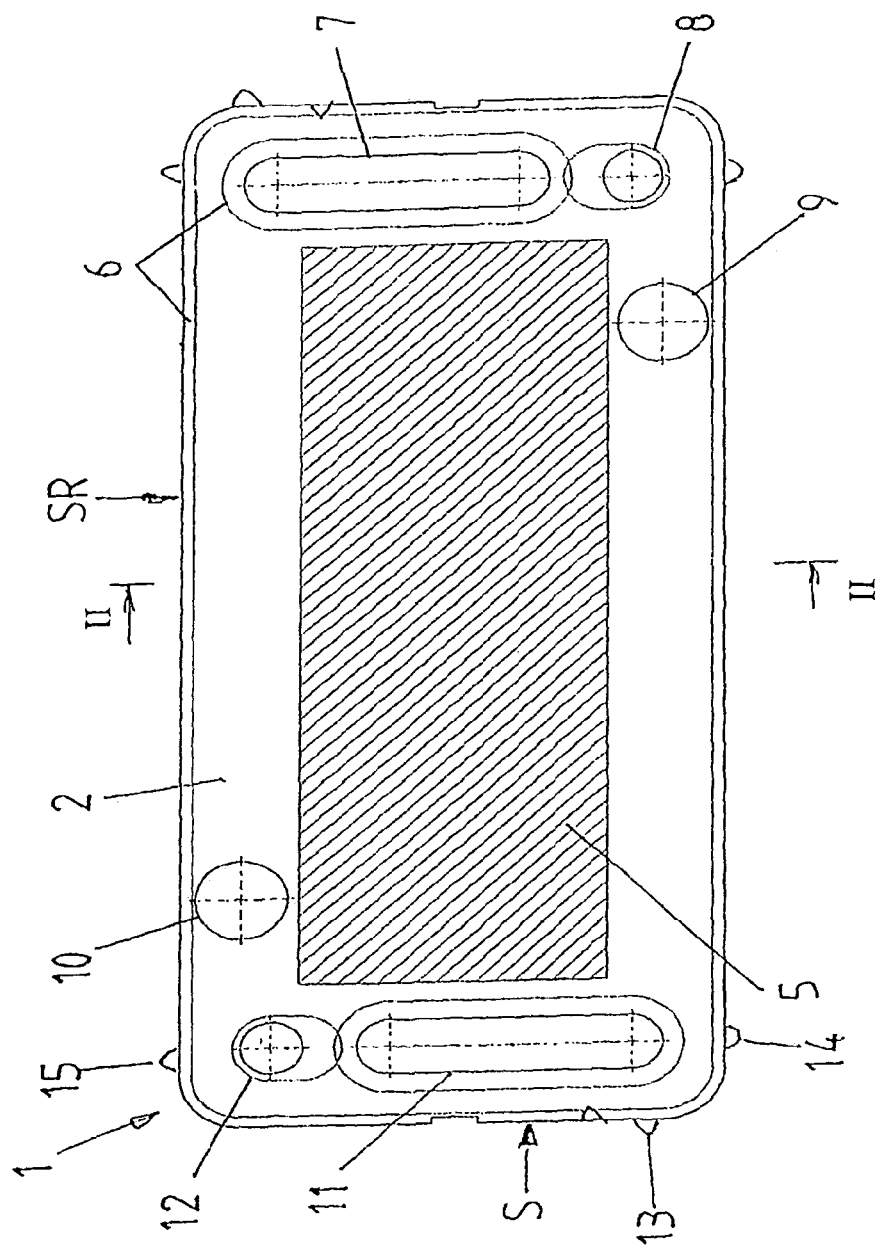
FIG. 1 is a view of a bipolar plate having a surface structure, inner forms and reference geometries according to the prior art.
Figure 2:
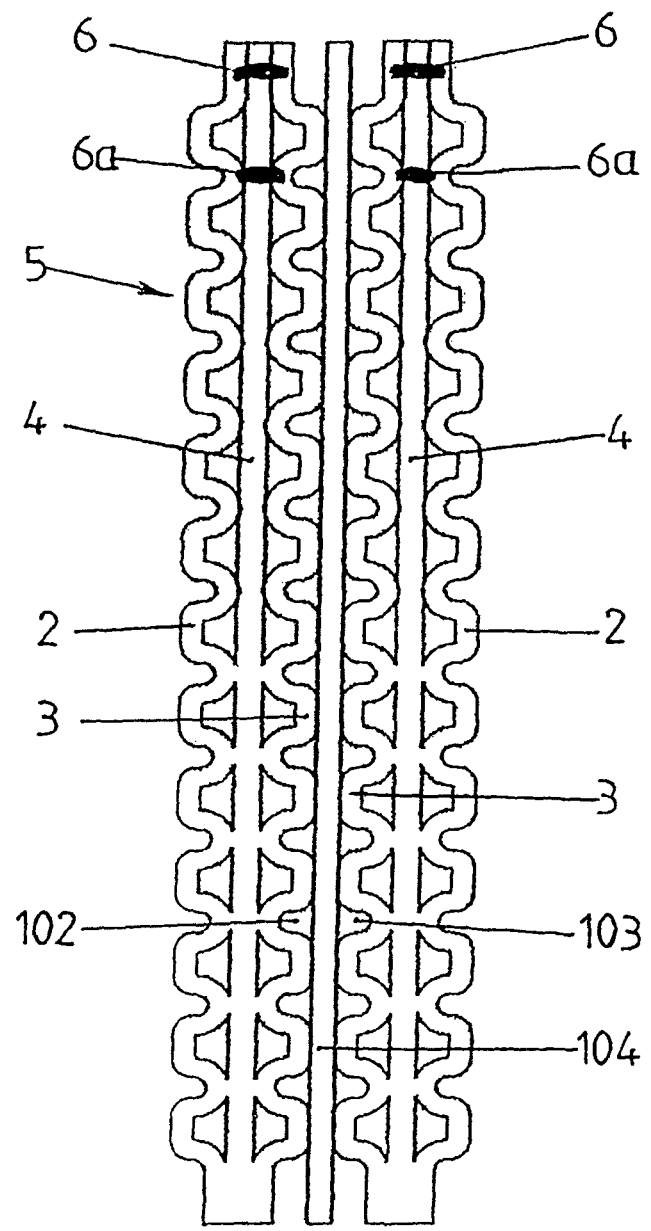
FIG. 2 is a cross section along section line II-II of FIG. 1.

FIGS. 1 and 2 show an example of a metallic, multilayer bipolar plate 1 according to the prior art. This known bipolar plate comprises a first plate 2, a second plate 3 and an intermediate plate 4 inserted between the first and second plates 2 and 3. A surface structures, for example in the form of channels or ridges, is formed in the plates 2 and 3 in the longitudinal direction of the plates, and therefore the side of the intermediate plate 4 having the first plate 2 forms a so-called flow field for a cooling medium and the other side of the intermediate plate 4 having the second plate 3 forms a further flow field for a cooling medium. The flow fields 102 and 103 make it possible to distribute the reactants (hydrogen, air/atmospheric oxygen) evenly to the left and right of a proton-conducting membrane 104. Weld seams 6a hold the bipolar plate 1 together and minimize electrical resistance. The plates 2, 3 and 4 are circumferentially connected in a water-tight manner at the end-face and lateral edges S and SR thereof by way of a welding seam 6.

In the end-face region S and partially at the lateral edge SR, the plates 2 and 3 have an inlet opening 7 for hydrogen, an inlet opening 8 for air/oxygen and an inlet opening 9 for the cooling medium and corresponding outlet openings 10, 11 and 12 for the cooling medium and the reaction products. Reference geometries 13, 14 and 15 are formed in both end-face regions S of the bipolar plate 1.

Reference geometries 13, 14 and 15 serve to compensate for forming-induced geometrical tolerances in subsequent assembly and, in particular, to minimize the offset of the individual layers of a bipolar plate.

Figure 3:
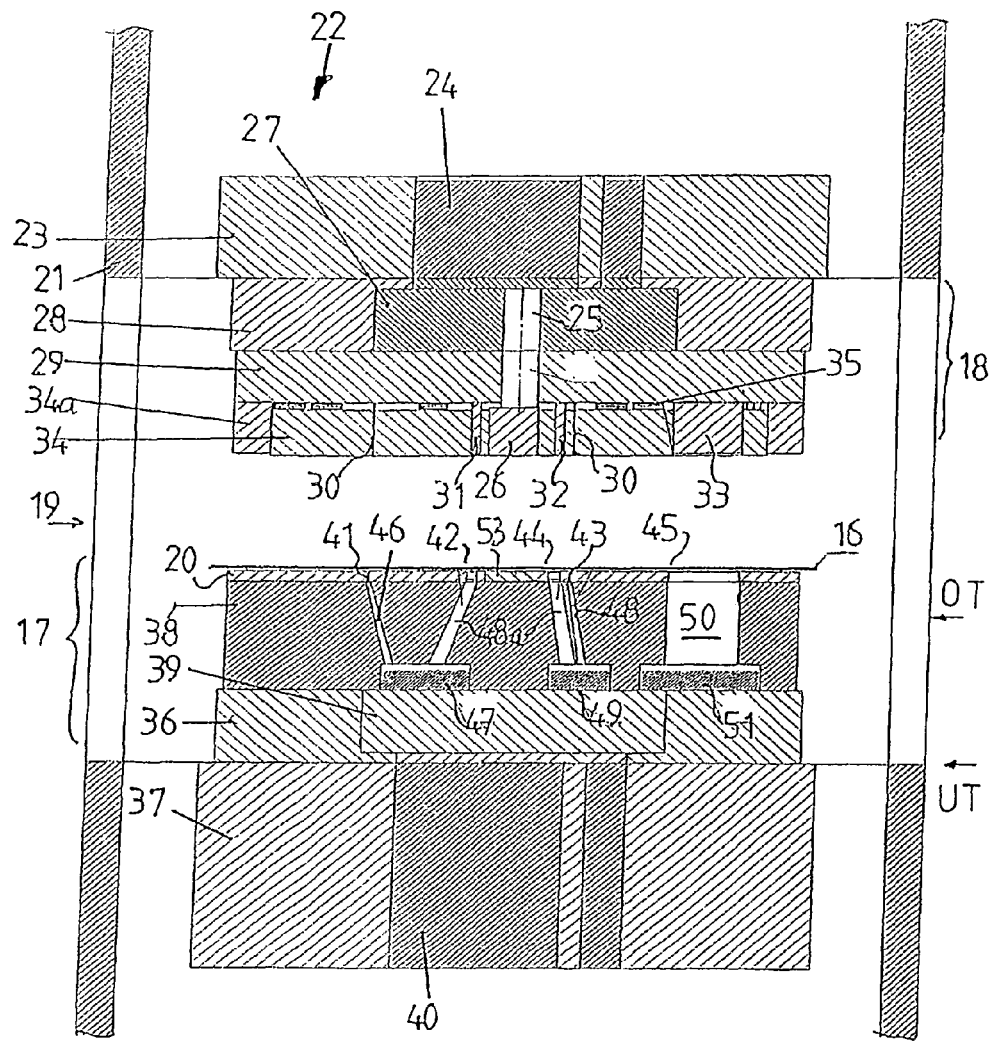
FIG. 3 is a sectional view of the device according to the invention in the opened state.

The device according to the invention is depicted schematically in FIG. 3. The metal-foil strip 16, which is wound onto a non-illustrated coil and is made of the material X2CrNiMo 1.4404 or X2CrNiMo 18-14-3 having a thickness of 0.1 mm, is fed between the lower tool part 17 and the upper tool part 18 into the opened tool 19. The metal-foil strip 16 lies on a cutting die 20 of the lower tool part 17.

The upper tool part 18 is immovably mounted on the upper press table 23, which is held by the press stand 21 of a fine-blanking press 22. The knife-edged ring piston 24, which is actuatable by the knife-edged ring hydraulics of the fine-blanking press 22, is guided in the press table 23 and acts on the chasing form 26 of a forging die via the thrust bolt 25. The thrust bolt 25 is axially displaceable in a holding plate 27, which is accommodated by an upper tool-change plate 28, and in an upper base 29, thereby ensuring that forming forces can be transmitted to the chasing form 26 without tilting moment.

The further active elements, such as the free-cutting punch 30 for cutting a blank Z (FIG. 4) partially free of the metal-foil strip 16, the inner-form punch 31 for piercing the inner forms (inlet openings 7, 8, 9 and outlet openings 10, 11, 12), the cutting punch 32 for cutting the reference geometries 13, 14 and 15 and the outer-contour cutting punch 33, are mounted on the upper base 29. The free-cutting punch 30, the inner-form punch 31, the cutting punch 32 and the outer-contour cutting punch 33 are guided in a punch-guiding insert 34, which lies in a guide holder 34a.

Spring elements 35 for clamping the metal-foil strip 16 and making cutting travel possible for the active elements 30, 31, 32 and 33 are located between the punch-guiding insert 34 and the upper base 29.

The lower tool part 17 has a lower interchangeable plate 36, which is directly connected to the press ram 37 of the fine-blanking press 22, the press ram performing a reciprocating motion from bottom dead center UT and top dead center OT. The lower base 38 is mounted on the lower interchangeable plate 36, and a lower pressure pad 39, against which the counterholder piston 40 of the counterholder hydraulics works, is accommodated in the lower base.

The cutting die 20 is located on the lower base 38, the cutting die comprising a first and second cutting opening 41 and 43 for the free-cutting punch 30, a third cutting opening 42 for the inner-form punch 31, a fourth cutting opening 44 for the reference geometry and a fifth cutting opening 45 for the outer-contour cutting punch 33. Individual removal channels 46 are dedicated to each of the cutting openings 41 and 42, which extend through the lower base 38 and lead to a common conveyor belt 47 disposed underneath the cutting openings 41 and 42. It is therefore possible to easily remove cutting waste even when the tool is closed.

A removal channel 48 is also dedicated to each of the cutting openings 43 and 44, through which the cutting waste is discharged onto a common conveyor belt 49. A removal channel 50 extending vertically through the lower base 38 for discharging the finished blanks Z onto a further conveyor belt 51 is located underneath the cutting opening 45. Furthermore, a forging die 53 is disposed on the lower base 38 in a holder 52, the forging die being matched to the chasing form 26 belonging to the upper tool part 18 for forming.

Figure 4:
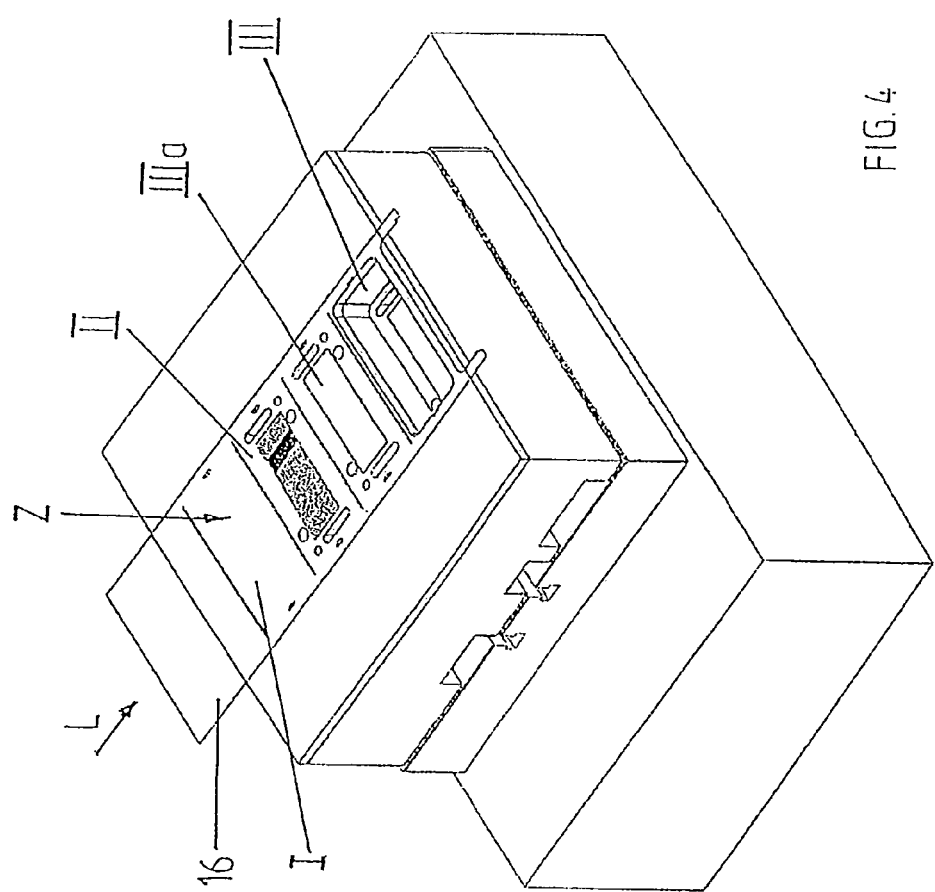
FIG. 4 is a schematic depiction of the sequence of the method according to the invention.

The sequence of the method according to the invention is described in greater detail in the following with reference to FIG. 4, in combination with FIG. 3. For clarity, FIG. 4 only shows the lower tool part 17 having a metal-foil strip 16 fed in the moving direction L. The device according to the invention for carrying out the method according to the invention comprises four stages in this example, namely: a first stage I, for partially free-cutting the end-face and lateral edges S and SR of the blank Z for the bipolar plate 1; a second stage II, for forming the surface structure 5 in the blank Z, piercing the inlet openings 7, 8, 9 and outlet openings 10, 11, 12 and cutting the reference geometries 13, 14 and 15 into the free-cut blank Z; an additional stage IIIa as the no-load stage; and a stage III for cutting the outer contour and removing the finished blank Z from the tool. A fine-blanking press 22 having a knife-edged ring piston 24 and a counterholder piston 40 acting hydraulically in opposition on the upper tool part 18 and the lower tool part 17 is used as the press.

Before the operations are started, the metal-foil strip 16 is clamped between the punch-guiding insert 34 of the upper tool part 18 and the cutting die 20 of the lower tool part 17. By way of the free-cutting punch 30, the blank Z is cut partially free at the end-face edges S and the lateral edges SR at the corresponding cutting openings 41 and 42 in the cutting die 20 in the first stage I.

The remaining regions of the blank Z remain connected to the metal-foil strip 16.

The tool opens upon the return stroke of the active elements and releases the clamped metal-foil strip 16. A non-illustrated feed moves the metal-foil strip 16 comprising the connected blank Z into the stage II, where the metal-foil strip 16 is clamped once more when the tool is closed.

The knife-edged ring hydraulics are coordinated such that the chasing form 26 precedes the piercing and cutting punches 31 and 32, respectively, during the reciprocating motion thereof. This makes it possible to carry out the forming and cutting successively in a vertical sequence within stage II, wherein the blank Z remains connected to the metal-foil strip 16.

The chasing form 26 and the forging die 53 are provided with a matching surface structure, which corresponds to the desired surface structure 5 in the flow field of the bipolar plate 1 (see FIGS. 7A-E).

The forming force for forming the surface structure in the connected blank Z is at least 2500 to 3500 kN, thereby ensuring that the entire flow field attains a uniform structure.

Once the forming, piercing and cutting in stage II is completed, the active elements perform a return stroke once more and the tool opens.

The metal-foil strip 16 comprising the connected, formed and cut blank Z can be pushed via the feed into stage IIIA, in which only a no-load stroke is performed. This ensures that adequate separation arises between the individual blanks Z and prevents an overlap of unwanted states of stresses in the subsequent blank resulting from the considerable forming forces.

After the tool opens once more, the feed moves the metal-foil strip 16 comprising the connected blank Z into stage IIIa. The strip and the blank Z are clamped. The outer-form cutting punch 33 completely severs the blank Z from the metal strip film 16 at the cutting opening 45. The finished blank Z then drops through the removal channel 50 onto the conveyor belt 51, which conveys the blank out of the tool.

Figure 5:
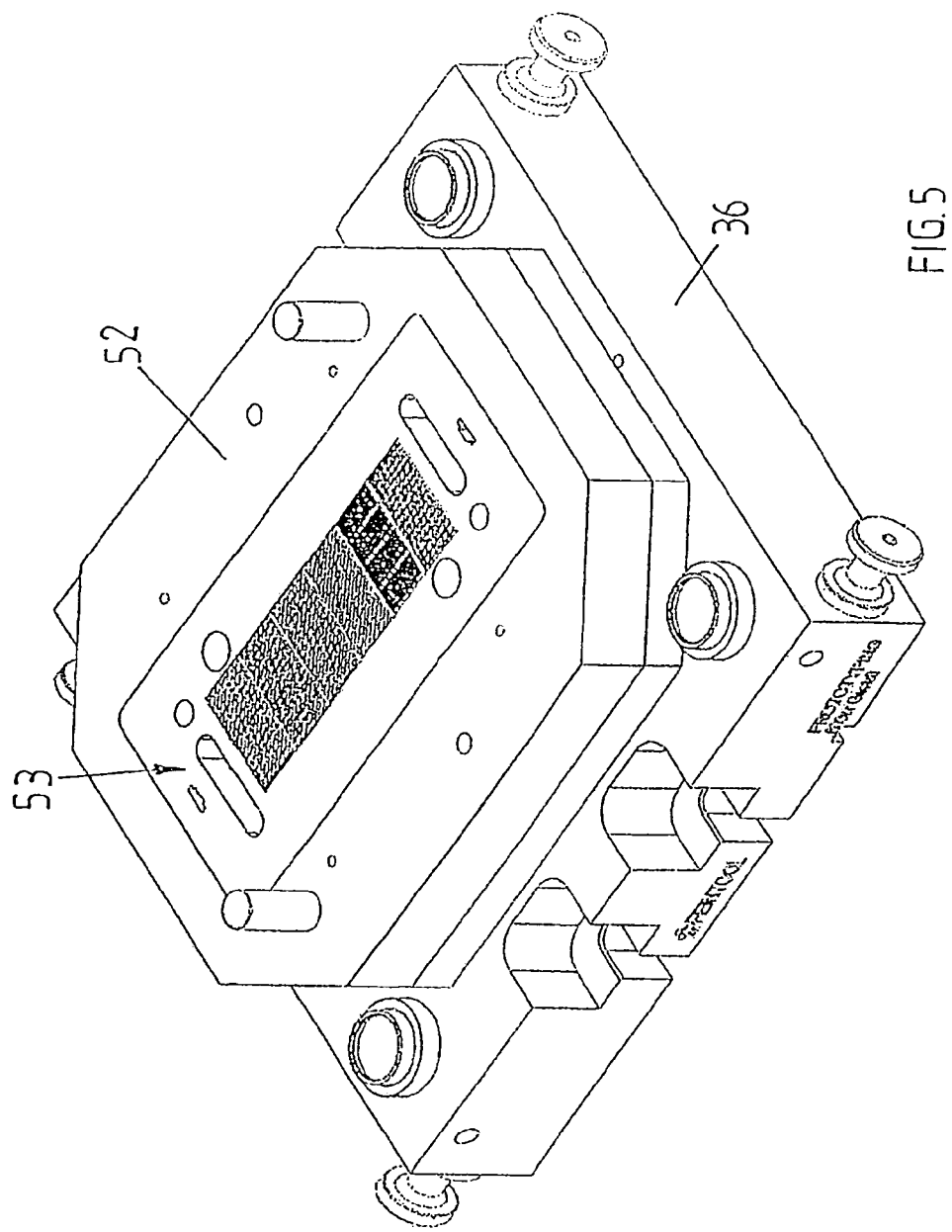
FIG. 5 is a perspective view of the forging die for forming the surface structure.
Figure 6:
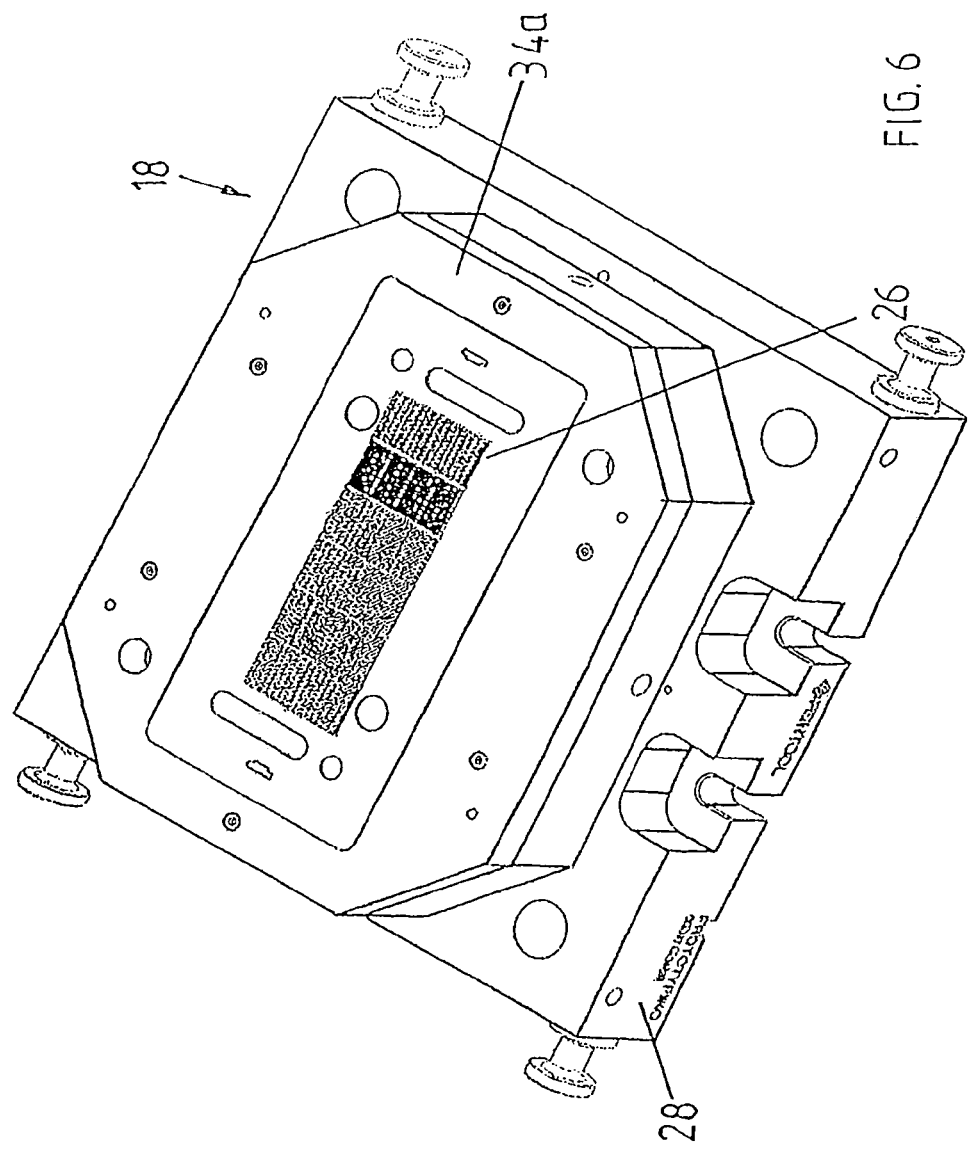
FIG. 6 is a perspective view of the chasing form for forming the surface structure.
Figure 7A:
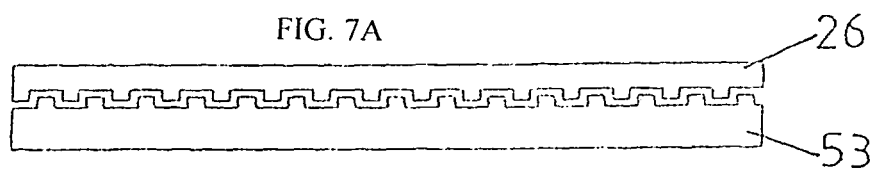
FIG. 7A-E are views of various surface structures of the chasing form and the forging die that can be formed in the blank for a bipolar plate with the invention.
Figure 7B:
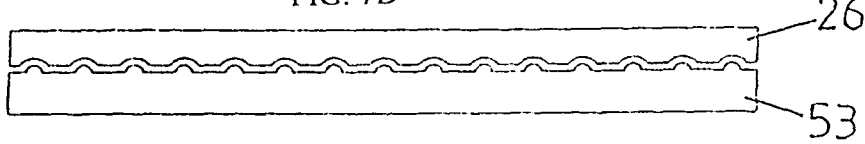
Figure 7C:
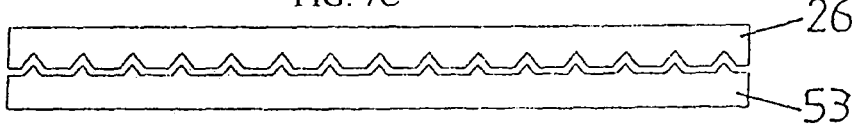
Figure 7D:
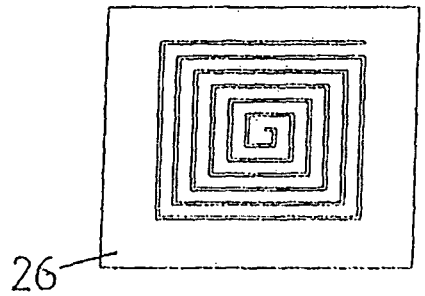
Figure 7E:
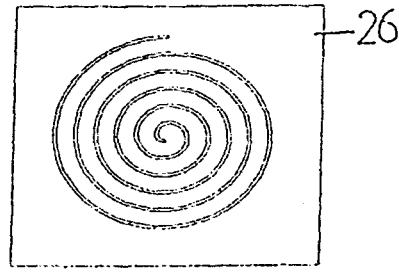

FIGS. 5 and 6 show the forging die 53, which is mounted on the lower interchangeable plate 36 of the lower tool part, and the chasing form 26, which is accommodated in the punch-guiding insert 34 of the upper tool part.

FIGS. 7A-E show possible surface structures for the chasing form and forging die 26 and 53, respectively, which can be stockpiled as exchangeable units for different surface structures.

The method according to the invention makes it possible to easily and cost effectively produce anode- and cathode-side plates and intermediate plates for bipolar plates with high dimensional consistency and effectiveness.

The invention claimed is:

1. A method for producing a bipolar plate by fine blanking, with a fine blanking press, the bipolar plate comprising a metal-foil plate having a surface structure for a flow field, inner forms in the plate, and at least one reference geometry on a periphery thereof, the method comprising:
   feeding a metal-foil strip to a tool of the fine blanking press which opens at a lower dead-center position of a ram of a hydraulic fine-blanking press and closes at an upper dead-center position of the ram of the press;
   clamping the strip between an upper part of the tool, which comprises at least a forming punch, a cutting and piercing punch and a guide and is mounted on a table of the fine blanking press, and at least one lower part of the tool which comprises a cutting die and performs a stroke between the upper and lower dead-center positions upon closing of the tool;
   wherein the tool comprises a progressive die configured to perform successive operations, each in a single cycle of a vertical stroke of the press ram thereby cutting and forming a blank from the strip, the successive operations comprising
   a first operation comprising cutting the blank partially free in the strip,
   a second operation performed in a single vertical sequence of the cycle comprising forming the surface structure in the blank by compression-forming using a forming force of 2500 to 3500 kN and producing an inner form of said inner forms in which the inner form comprises at least one opening pierced through the blank, slots and the at least one reference geometry in and on the blank by cutting the blank, and
   a third operation comprising cutting an outer contour of the blank to finish the blank as the bipolar plate and removing the finished blank from the tool; and
   wherein
   a) end-face edges of the blank and, optionally, lateral edges of the blank are cut free of the strip while the blank remains otherwise connected to the strip,
   b) the tool is opened upon a return stroke of the forming, piercing and cutting punches and the strip comprising the partially cut-free blank is advanced for the compression-forming, piercing and cutting, and the strip is clamped and the compression-forming of the surface structure followed by the producing of the inner form and the reference geometry are carried out sequentially as the ram moves vertically within the second stage while the connection of the blank to the strip is retained, and
   c) the tool is reopened upon retraction of the forming, cutting and piercing punches to the upper dead-center position and the blank having been cut-free, compression-formed, pierced and cut is advanced to the third working stage for the cutting of the outer contour to complete the bipolar plate, and the blank is separated completely from the strip and falls onto and is removed from the closed tool by a conveyor belt located vertically below a cutting plane of the closed tool.

2. The method according to claim 1, wherein in the second stage the surface structure is produced by a forging die in the lower tool part and a chasing form in the upper tool part, and the inner form is produced by a cutting and piercing punch in the upper tool part and the cutting die in the lower tool part.

3. The method according to claim 1, wherein the structure formed in the second stage comprises at least one structure of a meander-shaped channel, a spiral channel, a groove, and a knob.

4. The method according to claim 1, wherein the structure formed in the second stage comprises at least one structure having a u-, oval-, semicircular-, parabolic- or v-shaped cross section.

5. The method according to claim 1, further comprising an additional stage in the form of a no-load stroke carried out between the second and third stages.

6. The method according to claim 1, wherein the metal-foil strip is made of at least one of stainless steel, other steel, aluminum, aluminum alloys, titanium, and titanium alloys and is of a thickness of 0.1 to 0.5 mm.

7. The method according to claim 1, wherein the at least one reference geometry is a plurality of reference geometries.

8. A fine blanking press for producing a bipolar plate comprising a metal-foil strip, the bipolar plate being produced to have a surface structure for a flow field, inner forms, holes, slots, and at least one reference geometry on an outer form thereof, the fine blanking press comprising:

a tool comprising a progressive die driven by a ram of the fine blanking press;

the tool comprising an upper tool part and a lower tool part;

the upper tool part being mounted on a table of the fine blanking press, and comprising a piercing punch and a cutting punch and a guide holder; and the lower tool part performing a vertical stroke between upper and lower dead-center positions of the ram and comprising at least one cutting die; and wherein the at least one cutting die of the lower tool part comprises a progressive die configured to perform three successive operations, each during a single cycle of a vertical stroke of the press ram;

wherein the first operation is partially cutting free the blank from the metal-foil strip, to maintain a connection of the blank to the strip, by cutting the strip to form an end-face and, optionally, lateral edges of the blank;

wherein the second operation is forming the surface structure in the blank, piercing the inner forms and cutting the reference geometries on the partially cut-free blank in a single vertical sequence of the cycle while the connection to the blank in maintained;

wherein the third operation is cutting an outer contour of the blank to finish forming of the bipolar plate from the metal-foil strip and for removing the bipolar plate from the tool;

wherein the fine-blanking press has a knife-edged ring piston and a counterholder piston acting hydraulically in opposition on the upper tool part; and wherein the lower tool part, the knife-edged ring piston, and the counterholder piston are coordinated with one another such that, at least one chasing form of the upper tool part operates with the second stage of the lower tool part so that forming precedes the piercing and cutting punches during reciprocating motion of the tool parts.

9. The fine blanking press according to claim 8, wherein the lower tool part comprises first and second cutting openings disposed in the cutting die for the partial cutting free of the blank, and the upper tool part comprises a punch for completely separating the blank from the strip, and the fine blanking press further comprises first and second waste channels communicating between the first and second cutting openings and first and second conveyor belts disposed underneath the lower tool part for removing waste from the tool.

10. The fine blanking press according to claim 9, wherein the lower tool part comprises at least one forging die inserted in a holder and that has a surface structure adapted to the shape and position of the surface structure for the bipolar plate, third and fourth cutting openings disposed in the cutting die for the piercing punch for producing the inner forms of the bipolar plate;

wherein said at least one forging die of the lower tool part and a chasing form of the upper tool part are configured to produce together the surface structure of the bipolar plate, the chasing form being inserted into a punch-guiding insert;

wherein the upper tool part further comprises at least the piercing punch and the cutting punch; and wherein second and third waste channels provide a communication path between the third and fourth cutting openings of the lower tool part and the first and second conveyor belts disposed underneath the lower tool part, the first and second conveyor belts being for removing said waste from the tool.

11. The fine blanking press according to claim 10, wherein the upper tool part comprises at least one outer-contour cutting punch for cutting the blank completely free and a fifth cutting opening disposed in the cutting die, and the apparatus further comprises a fifth waste channel communicating between the fifth cutting opening and a third conveyor belt disposed underneath the upper tool part for removing the blank from the tool.

12. The fine blanking press according to claim 10, wherein the forging die and the chasing form have a surface structure comprising grooves, or meander-shaped or spiral channels, or knobs.

13. The fine blanking press according to claim 10, wherein the forging die and the chasing form have a surface structure comprising grooves or meander-shaped or spiral channels, said grooves or channels being of a u-, oval-, semicircular-, parabolic- or v-shaped cross section.

14. The fine blanking press according to claim 10, wherein the second stage includes means for cutting a plurality of reference geometries.

15. The fine blanking press according to claim 6, wherein the stainless steel is one of X2CrNiMo 1.4404 or X2CrNiMo18-14-3.

16. The method according to claim 6, wherein the metal-foil strip is of thickness 0.1 mm.

* * * * *